(12) United States Patent
Blumentritt

(10) Patent No.: US 11,713,049 B2
(45) Date of Patent: Aug. 1, 2023

(54) CONTROL SYSTEM FOR A MOTOR VEHICLE, METHOD FOR OPERATING THE CONTROL SYSTEM, AND MOTOR VEHICLE HAVING SUCH A CONTROL SYSTEM

(71) Applicant: Volkswagen Aktiengesellschaft, Wolfsburg (DE)

(72) Inventor: Marc Blumentritt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 208 days.

(21) Appl. No.: 16/957,708

(22) PCT Filed: Jan. 8, 2019

(86) PCT No.: PCT/EP2019/050346
§ 371 (c)(1),
(2) Date: Jun. 24, 2020

(87) PCT Pub. No.: WO2019/141541
PCT Pub. Date: Jul. 25, 2019

(65) Prior Publication Data
US 2021/0061295 A1  Mar. 4, 2021

(30) Foreign Application Priority Data

Jan. 18, 2018 (DE) ..................... 10 2018 200 820.5

(51) Int. Cl.
*B60W 10/04* (2006.01)
*B60W 50/00* (2006.01)
(Continued)

(52) U.S. Cl.
CPC ........ *B60W 50/0098* (2013.01); *B60W 10/04* (2013.01); *B60W 10/18* (2013.01);
(Continued)

(58) Field of Classification Search
CPC .. B60W 50/0098; B60W 10/04; B60W 10/18; B60W 10/20; B60W 40/08;
(Continued)

(56) References Cited

U.S. PATENT DOCUMENTS

2005/0135625 A1   6/2005  Tanizawa et al.
2013/0346751 A1*  12/2013 Hannel ................. H04L 63/105
                                                          713/168
(Continued)

FOREIGN PATENT DOCUMENTS

DE    102005048337 A1    4/2007
DE    102007019724 A1   10/2008
(Continued)

OTHER PUBLICATIONS

PCT/EP2019/050346. International Search Report (dated Mar. 27, 2019).

*Primary Examiner* — Jonathan M Dager
*Assistant Examiner* — Jean W Charleston
(74) *Attorney, Agent, or Firm* — Peter Zura; Loza & Loza, LLP

(57) ABSTRACT

The invention relates to a control System (2) for a motor vehicle (1), comprising a central vehicle Controller (3) for Controlling vehicle functions (4) and a plurality of driver assistance Systems (5). The driver assistance Systems (5) are set up to transmit a task key describing the particular assistance function thereof to the vehicle Controller (3) and to transmit a security key assigned to the particular assistance function to the vehicle Controller (3). The central vehicle Controller (3) is set up to identify a particular task of the driver assistance Systems (5) on the basis of the transmitted task keys, to carry out a security check by virtue of the vehicle Controller (3) checking, on the basis of the security keys transmitted in each case for the respectively identified tasks, whether the particular security key complies
(Continued)

with at least one security level assigned to the particular task, and, if the security check was successful, to control the vehicle functions (4) according to respective control commands transmitted by the driver assistance System (5) in Order to perform the respective assistance functions. The invention also comprises a method for operating such a control System (2) and a motor vehicle (1) having such a control System (2).

21 Claims, 1 Drawing Sheet

(51) Int. Cl.
  *B60W 10/18* (2012.01)
  *B60W 10/20* (2006.01)
  *B60W 40/08* (2012.01)
(52) U.S. Cl.
  CPC ............ *B60W 10/20* (2013.01); *B60W 40/08* (2013.01); *B60W 2050/0043* (2013.01)
(58) Field of Classification Search
  CPC ............ B60W 2050/0043; H04W 4/48; H04L 9/0819; H04L 67/12; H04L 2209/84; H04L 63/10; H04L 63/20; H04L 63/08; H04L 63/0428

USPC .......................................................... 701/41
  See application file for complete search history.

(56) References Cited

U.S. PATENT DOCUMENTS

| | | | |
|---|---|---|---|
| 2017/0225689 A1* | 8/2017 | Mukai | B60W 20/11 |
| 2017/0305418 A1* | 10/2017 | Bae | G08G 1/166 |
| 2017/0344299 A1* | 11/2017 | Ivanov | B60W 30/09 |
| 2018/0052465 A1* | 2/2018 | Poledna | G06F 11/1487 |
| 2018/0107473 A1* | 4/2018 | Ahmed | G06F 8/654 |
| 2018/0158336 A1* | 6/2018 | Ewert | G08G 1/161 |
| 2018/0267550 A1* | 9/2018 | Kopetz | G05D 1/0214 |
| 2018/0362013 A1* | 12/2018 | Ungermann | B60T 7/14 |

FOREIGN PATENT DOCUMENTS

| | | |
|---|---|---|
| DE | 102009045936 A1 | 4/2010 |
| DE | 102014209489 A1 | 11/2015 |
| DE | 102015201010 A1 | 7/2016 |
| WO | 2017042012 A1 | 3/2017 |
| WO | 2017051170 A1 | 3/2017 |
| WO | WO-2017051170 A1 * | 3/2017 ........... H04L 63/062 |

* cited by examiner

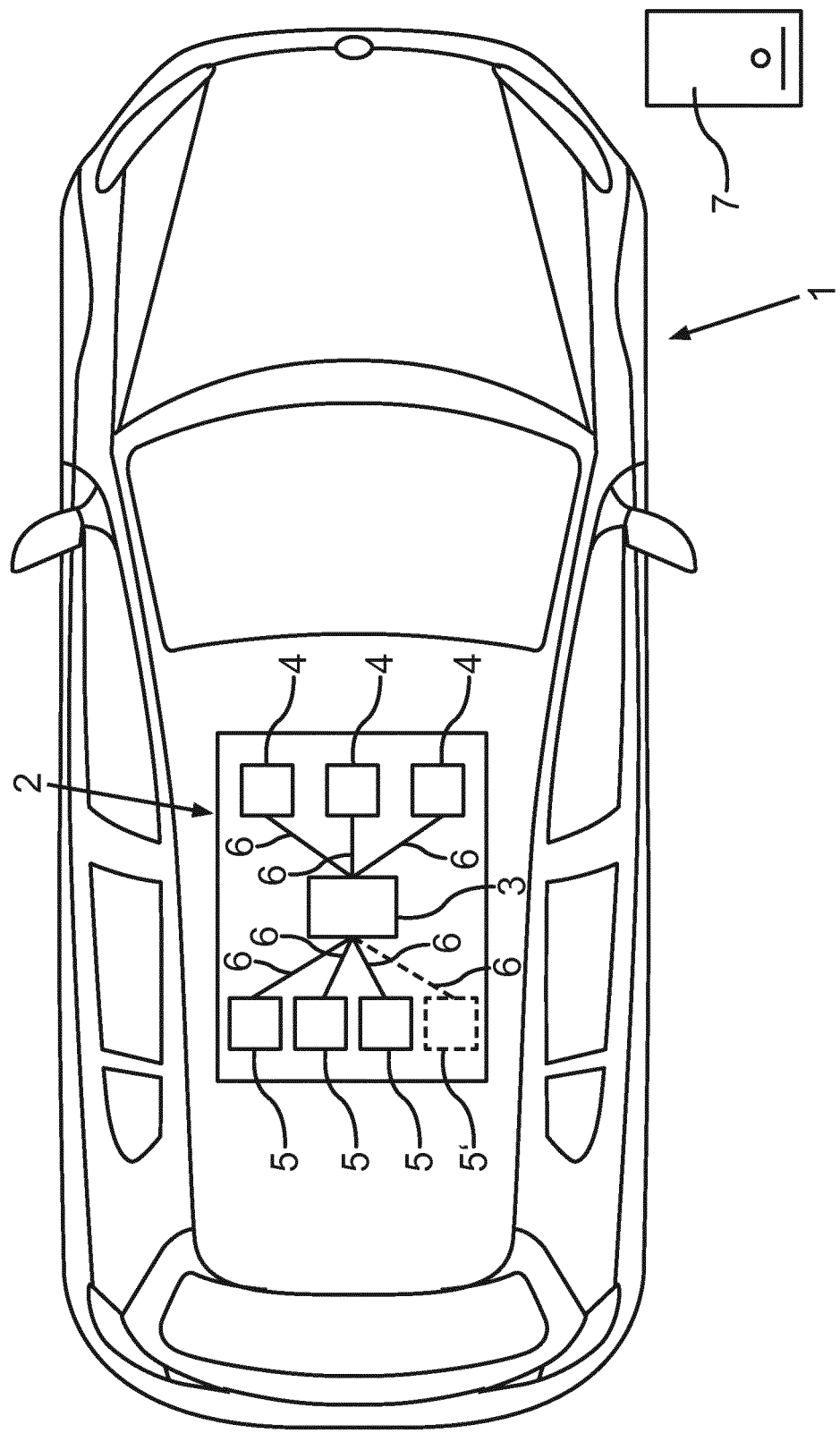

CONTROL SYSTEM FOR A MOTOR VEHICLE, METHOD FOR OPERATING THE CONTROL SYSTEM, AND MOTOR VEHICLE HAVING SUCH A CONTROL SYSTEM

RELATED APPLICATIONS

The present application claims priority to international patent app. no. PCT/EP2019/050346 to Marc Blumentritt, filed Jan. 8, 2019, which claims priority to German patent app. no. DE 2018 200 820.5, filed Jan. 18, 2018, the contents of each being incorporated by reference in their entirety herein.

BACKGROUND

The present disclosure relates to a control system for a motor vehicle, a method for operating the control system for a motor vehicle, and a motor vehicle that has such a control system.

Conventional communication in motor vehicles between individual components in the motor vehicle frequently took place via data busses. Signals are sent between individual components via these data busses in cyclical fixed time intervals. In the case of conflicts between these signals, the activation of the components in the motor vehicle take place in accordance with predetermined priority guidelines. These signals are determined prior to delivery of the motor vehicle, such that no additional signals can be added at a later point in time. This means that all of the vehicle functions available in a motor vehicle, e.g., all of the driver assistance system functions and any activation of actuators in the motor vehicle, are determined prior to delivery of the motor vehicle. In addition, all communication relationships between individual control units in the motor vehicle are defined in advance. A subsequent integration of a new driver assistance system, for example, requires a great deal of effort.

A method is described in DE 10 2005 048 337 A1, with which it is possible to continuously monitor the functioning of a motor vehicle. The mechanisms available for this include, among other things, detection and evaluation of technical errors, quick correction of the error, independently of the time and location, e.g. through updates, and execution of feature upgrades for electronic vehicle components. An electronic assistant in the vehicle is accessed in the framework of this method, which continuously acquires vehicle information in time intervals or in an event-driven manner, on the basis of test codes stored in a local assistance data base in the electronic assistant. This vehicle information is then compared with reference data stored in a local reference data base in the electronic assistant, and evaluated. Depending on the evaluation results, the electronic assistant reaches a decision regarding the necessity of taking action. If it is determined that it is necessary to take action, the action functions that are necessary for stopping or adjusting an operating function are executed or the action functions are sent to an executing vehicle component.

A vehicle assistance system for installation in a vehicle is described in DE 10 2009 045 936 A1 that contains a communication interface for receiving human-machine interface elements for a mobile device from the devices, and a control unit for using the human-machine interface elements from the devices. When the mobile device is used in a vehicle, this driver assistance system is configured such that it authenticates the transmitted human-machine interface elements from the devices, and then accepts them, or uses a standard human-machine interface element in the vehicle for generating a specific function.

There is a need in the art to create a solution by means of which a new driver assistance system, or updates for driver assistance systems can be integrated in an already delivered vehicle in a particularly simple manner.

BRIEF DESCRIPTION OF THE DRAWING

Further advantages, features and details of the invention can be derived from the following description in which exemplary embodiments of the invention are described in detail with reference to the drawing. Features specified in the claims and the description can each be substantial to the invention in and of themselves, or in arbitrary combinations thereof. Therein:

FIG. 1 shows a schematic illustration of a motor vehicle with a control system under an illustrative example.

DETAILED DESCRIPTION

The exemplary embodiment explained below is a preferred embodiment of the invention. In the exemplary embodiment, the components of the embodiment described herein are each individual features to be regarded independently, each of which are also developed by the invention, and thus can also be regarded, individually or in combinations other than that shown, as part of the invention. Furthermore, the embodiment described herein can also be supplemented by features other than those already described.

The present disclosure shows a control system for a motor vehicle, a method for operating this control system for a motor vehicle, and a motor vehicle that has such a control system.

The control system for a motor vehicle according to the present disclosure may include a central vehicle control for activating vehicle functions, and numerous driver assistance systems. The driver assistance systems are configured to send control commands relating to vehicle functions for their respective assistance functions to the vehicle control, transmit a function key that describes the respective assistance functions to the vehicle control, and transmit a safety key assigned to the respective assistance functions to the vehicle control. The central vehicle control is configured to detect a respective function of the driver assistance system based on the transmitted function key, conduct a safety test, in that the vehicle control checks whether the respective safety key satisfies at least one safety level assigned to the respective function, based on the respective safety key for the respective detected functions, and if the safety test is successful, activate the vehicle function in accordance with the respective control commands transmitted from the driver assistance system for executing the respective assistance function.

The control system for a motor vehicle disclosed herein therefore includes at least one control and regulating unit, as well as numerous driver assistance systems. The control and regulating unit may be configured as a central unit in the motor vehicle, or central vehicle control, which can, among other things, activate various actuators in the motor vehicle. The numerous driver assistance systems may be configured as electric auxiliary devices in the motor vehicle for supporting the driver in certain driving situations, wherein these driver assistance systems can transmit details regarding their respective auxiliary functions to the central vehicle control for executing the auxiliary functions. In addition, driver assistance systems can send respective signals containing information regarding the role of the respective auxiliary function, or function keys, to the central vehicle control. In addition to these function keys, signals regarding the safety level of the respective driver assistance system, or the corresponding auxiliary function of the driver assistance system, are transmitted to the central vehicle control. This safety key contains, for example, information regarding an ASIL (Automotive Safety Integrity Level, see ISO 26262) assigned to the driver assistance systems, which is composed of information regarding the severity of an error in the driver assistance system, the probability of the occurrence of a driving situation in which an error is dangerous, and information regarding the controllability of the error. The ASILs may be classified as QM, A, B, C, and D, where QM is the lowest and D is the highest safety level. The safety key can also comprise a classification of the functional safety of the driver assistance system in accordance with another danger level standard.

The central vehicle control itself may be configured to determine which assistance function the corresponding driver assistance systems want to execute on the basis of the function key, for example, which roles the individual driver assistance systems want to assume in the motor vehicle. As soon as the respective functions of the driver assistance system have been identified, the central vehicle control executes a safety check. In some examples, it may be checked in the framework of this safety check whether the transmitted safety key satisfies the minimum requirements for the necessary safety level of the corresponding function of the driver assistance system. If this is the case, the central vehicle control activates the actuators of the motor vehicle in accordance with the details for executing the assistance function transmitted from the driver assistance system. The control commands relating to the individual vehicle functions sent to the central vehicle control from the driver assistance system are then executed by the central vehicle control when the safety test is successful.

If the safety test is not successful, the actuators of the motor vehicle are not activated in accordance with the control commands from the driver assistance system. Furthermore, if a function described by a corresponding function key is not known to any of the driver assistance systems in the central vehicle control, the respective assistance function is not executed in accordance with the respective control commands transmitted from the driver assistance system.

In addition to the central vehicle control, the control system for a motor vehicle also may include numerous driver assistance systems, such as a parking assistant, lane retention assistant, or traffic assistant. The vehicle functions that can be controlled by the central vehicle control may include driving, braking, and steering the motor vehicle. Before the motor vehicle can park with the help of the parking assistant, for example, which can take place in accordance with a corresponding control command from the parking assistant, the parking assistant first sends a function key to the central vehicle control. This function key contains information labeled "parking," and thus indicates the role that this driver assistance system wants to assume in the motor vehicle. In addition to this function key, the parking assistant also transmits the safety key assigned to it to the central vehicle control. This safety key contains, for example, the information that the parking assistant has an ASIL D rating, and thus the highest possible safety level.

The central vehicle control is also configured to recognize the function of the parking assistant, such as the function "parking." In the framework of the safety check, it may be subsequently determined that the parking assistant satisfies the safety level requirements for the function "parking," because it has an ASIL D rating. After the central vehicle control successfully completes the safety test, the motor vehicle is parked in accordance with the control commands from the parking assistant. If the parking assistant has a significantly lower safety level, e.g. ASIL A, or the central vehicle control does not recognize the function "parking," the central vehicle control does not park the vehicle in accordance with the transmitted control commands from the parking assistant, because the safety test was not completed successfully.

Accordingly, the control system of the present disclosure may therefore be configured to first check whether a driver assistance system is authorized to send out control commands for executing an assistance function for the motor vehicle, prior to activating vehicle functions in accordance with the control commands from this driver assistance system. This may prevent an activation of the actuators in the vehicle due to either an error or through a digital attack on the control system for the motor vehicle, endangering the vehicle occupants and/or the vehicle environment. The control system may also be configured to execute the assistance functions of a driver assistance system that the central vehicle control recognizes based on their respective function keys. As a result, new assistance functions and updates for assistance functions can be relatively easily integrated in the system, because the central vehicle control only needs to recognize the corresponding function key in order to be able to implement these new assistance functions.

In another advantageous example, the vehicle control may be configured to steer, brake, and/or accelerate the motor vehicle by activating the vehicle functions. The central vehicle control can thus exert influence on the steering, brakes, and drive, and thus all of the actuators in the motor vehicle. It is also possible for the central vehicle control to control other vehicle components, e.g. blinkers, or lights. The central vehicle control is therefore a central unit in the motor vehicle that can control the movement of the vehicle, because it can at least control the drive, brakes, and steering of the motor vehicle. This is particularly advantageous because the driver assistance systems then do not have to be configured individually to control the individual actuators in the motor vehicle, e.g. via data busses between control units in the driver assistance systems and the actuators configured for this, and instead, the actuators can be controlled with corresponding communication signals sent to the central vehicle control.

In another advantageous example, the vehicle control is configured to offer predetermined functions, the function keys for which are stored in the vehicle control. Information regarding precisely defined roles for individual driver assistance systems is therefore stored in the central vehicle control. These functions are stored in the central vehicle control in the form of clearly defined function keys. The central vehicle control is therefore configured to offer various services, e.g. setting a speed, emergency braking, or executing specific directives regarding steering the vehicle. Further functions, not yet stored in the central vehicle control, can be added through an update for the vehicle control, and thus learned by the vehicle control. As a result, new or revised driver assistance system functions can also be added to an already delivered motor vehicle.

In another advantageous example, the vehicle control is configured to recognize the respective functions of the driver assistance systems by comparing the transmitted function key with the function keys stored in the vehicle control. The vehicle control is therefore configured to compare the transmitted function keys with the roles that it knows of. If the transmitted function key is, for example, the function key "parking," the central vehicle control first compares this information with the functions of the driver assistance system that it has. If it knows the function "parking," it has information regarding which actuators and other vehicle components may need to be activated in the framework of this function, such as the brakes, drive and steering in this case, as well as the blinkers. Each of the functions known to the vehicle control is also assigned a safety level that must be at least satisfied by the driver assistance system for the driver assistance system to be able to assume the respective function. This assignment of the functions of the driver assistance systems to the function keys enables a particularly safe control and regulation of the motor vehicle by the central vehicle control.

In another advantageous example, the vehicle functions each have control units that are configured to send the functions that can be executed by the respective vehicle functions to the vehicle control when the motor vehicle is started. As soon as the motor vehicle is activated, the individual vehicle functions are registered in the central vehicle control by the respective control units. The vehicle control therefore does not have to store which vehicle functions, i.e. which actuators, can be activated by the central vehicle control, because each time the motor vehicle is started, the respective control units for the vehicle functions tell the vehicle control which vehicle functions are available. After starting the motor vehicle, the control unit for the vehicle blinkers sends a signal to the central vehicle control indicating that the blinkers are available, such that the function "blinkers," and other functions comprising the activation of the blinkers, can be executed by transmitting the function key "blinkers," or some other corresponding function key. The central vehicle control therefore has access to information regarding the functioning vehicle functions available in the motor vehicle after it has been started. As a result, it is ensured that the central vehicle control only recognizes, and can allow, those functions that can actually be implemented by a corresponding activation of the vehicle functions of the motor vehicle.

In another example, any further data exchange between the vehicle control and the control units for the vehicle functions in the control system takes place in response to the driver assistance systems in the framework of executing the respective assistance function. Therefore, after registering the individual vehicle functions in the central vehicle control, a purely service-based communication protocol is subsequently carried out. The individual vehicle functions only send data, e.g. control commands, via their control units, to the central vehicle control in the framework of this communication protocol, if an activation of the corresponding vehicle functions is demanded by at least one of the driver assistance systems.

If, for example, the motor vehicle is to be parked using the parking assistant, the function key "parking" may also contain a blinking command for the blinkers in the motor vehicle, in order to indicate the parking procedure to other road users. In this case, after a successful safety check for executing the assistance function "parking," the blinkers in the motor vehicle are caused to blink in accordance with the control commands from the parking assistant in the central vehicle control, through a corresponding data exchange with the control unit for the blinkers. In comparison with conventional communication protocols in motor vehicles, the control unit for the blinkers does not continuously transmit the status notification "blinkers available" to the central vehicle control in specific time intervals, but instead sends this notification just once to the central vehicle control after starting the motor vehicle, and subsequently waits for corresponding signals from the vehicle control that are sent as soon as a driver assistance system requests access to the blinkers.

It is also possible for individual vehicle functions to notify the central vehicle control of a vehicle function failure or at least a partial failure thereof, via their control systems by means of corresponding signals. In this case, in addition to the initial registration of the vehicle functions in the central vehicle control, and in addition to the data exchange in the framework of requesting the execution of the respective assistance function in a driver assistance system, a data exchange takes place between the central vehicle control and the vehicle function.

In general, this service-based communication protocol between the components of the control system that enables communication between the individual components of the control system, for example, between the central vehicle control, the driver assistance system, and the vehicle functions of the individual control units, takes place with little effort.

In another advantageous example, the vehicle control is configured to also check whether the target specifications assigned to the respective functions are satisfied with regard to the current driving situation of the motor vehicle in the framework of the safety check, and if this check was successful, activate the vehicle functions in accordance with the control commands transmitted from the respective driver assistance system for executing the respective assistance function. The central vehicle control therefore checks how a current state of the motor vehicle, and its boundary conditions, correspond to predetermined target values during the safety check. If these additional target specifications are also satisfied, the safety check is regarded as successful, and the corresponding assistance functions of the driver assistance system can be carried out. The safety check can therefore comprise a comparison of function keys with corresponding safety keys and a checking of the current driving situation. It is also checked whether certain target specifications have been satisfied that relate to both the current driving system and the vehicle's environment in the framework of the safety check for the function key "parking" transmitted from a parking assistant, and the safety key ASIL D. With the parking assistant, or the function key "parking," the target specifications relate to the speed of the motor vehicle, as well as its position in the proximity of a potential parking space. This enables a particularly logical activation of the actuators in a motor vehicle, because this activation is only possible in situations in which a corresponding activation makes sense.

In another advantageous example, the vehicle control is configured to check at least a speed range, a driver presence indication, and/or specifications regarding the vehicle environment serving as the target specifications assigned to the respective functions. The target specifications that are also to be checked in the framework of the safety check are therefore minimum and maximum speeds, information regarding whether a driver is present in the interior of the vehicle, and/or information regarding the boundary conditions for the motor vehicle. With a parking assistant, it is checked, for example, whether the vehicle is moving within the speed range provided for parking the motor vehicle, which is normally less than 12 km/h. It is also checked, using corresponding sensor units on or in the motor vehicle, whether there is a parking space for the vehicle available in the vehicle's environment. Furthermore, it may be required that a driver be present in the vehicle in order to park using the parking assistant, which can be checked, for example, using a scale integrated in the seat of the motor vehicle. If all of these conditions are currently satisfied, and the function key and safety key sent to the central vehicle control from the parking assistant satisfy the corresponding requirements, the safety check for the parking assistant can be regarded as successful. The motor vehicle is then parked in accordance with the control commands sent from the parking assistant. Further limit value target ranges that must be satisfied relate, e.g., to the current lighting conditions, friction coefficients, or weather conditions. With a successful comprehensive safety check of this type, a particularly safe control of the motor vehicle can be obtained with the central vehicle control, the driver assistance systems, and the vehicle functions.

In another advantageous embodiment of the invention the vehicle control is configured, if it has successfully executed safety checks for numerous driver assistance systems, to establish a sequence for executing the respective assistance functions in accordance with a predetermined selection routine. There is therefore an arbitration concept in the central vehicle control with which the vehicle functions of the motor vehicle can be activated consistently. In some examples, the central vehicle control can respond with this arbitration concept, simultaneously as well as promptly, to the requests from the driver assistance systems it receives, and determine the most logical sequence for executing the individual assistance functions. Using the predetermined selection routine, it is possible to prevent, for example, a simultaneous braking and acceleration of the motor vehicle. A prerequisite for executing the predetermined selection routine is that the central vehicle control must have information regarding the functions of the driver assistance systems. This means that the vehicle control must be informed as to which functions which driver assistance systems want to assume at which point in time, and whether they are provided for executing these functions in accordance with their safety keys. This results in a particular safe functioning of the control system.

In another advantageous example, additional driver assistance systems may be integrated in the control system, if the respective assistance functions of the driver assistance system can be described with the function keys known to the vehicle control. Further driver assistance systems can therefore be accommodated in the control system, if the functions of these driver assistance systems, and therefore their assistance functions, can be assigned to the functions already stored in the central vehicle control. If an emergency braking assistant is also to be integrated in a motor vehicle, for example, which ultimately wants to carry out a specific activation of the brakes in the motor vehicle, either the function "emergency braking" can already be stored in the central vehicle control, or the function of emergency braking assistance can be described with the function key "braking," which is known to the central vehicle control. As soon as a corresponding software for the motor vehicle is integrated in the motor vehicle software by means of an update, for example, via a corresponding communication connection with an external server or using a mobile data carrier, e.g. a USB stick at an interface in the motor vehicle, this additional driver assistance system can be used, if the corresponding function key for the driver assistance system is already stored in the central vehicle control. It is also possible to update the central vehicle control, such that new functions can be retroactively added, e.g. "emergency braking," i.e. in an already delivered motor vehicle. It is also possible to temporarily activate additional driver assistance systems, e.g. in the framework of a corresponding subscription, e.g. using a corresponding data exchange between the motor vehicle and an external server via the communication connection. This external server can be provided by the vehicle manufacturer or a corresponding service provider. This enables a particularly advantageous and easily executed integration of additional driver assistance systems in an already delivered motor vehicle.

In another advantageous example, the driver assistance systems may be configured to transmit the function and safety keys such that their data sets are protected against unintentional alteration of individual bits through random hardware errors within the respective data sets. The function and safety keys are therefore sent within the motor vehicle from the corresponding driver assistance systems to the central vehicle control, such that these data are protected against so-called bit flips, for example, against unintentional alteration of individual bits within a data set. Such a bit flip can either be caused by a technical error or by corresponding external influences, e.g., caused by the effects of electromagnetic radiation. To enable a transmission of the function and safety keys protected against bit flips, these keys are transmitted as larger files (e.g., as 64-byte numeric values), as opposed to smaller files (e.g., three-bit files). As a result, the probability of transmitting an erroneous function or safety key due to a bit flip is relatively low. Methods for preventing or reducing bit flip probability in data sets are therefore used. This enables a particularly well protected transmission of the function and safety keys from the driver assistance system to the central vehicle control that is only slightly vulnerable to error.

In another advantageous example, the driver assistance systems may be configured to transmit the function and safety keys in encrypted form. This means that the function and safety keys are not only protected against bit flips, but they are also encoded, so that they are particularly resistant to manipulation, such as unauthorized reading, when they are transmitted. This also increases the security level of the data exchange in the control system for a motor vehicle.

In another advantageous example, any data exchange between the vehicle control and the driver assistance systems in the control system is encrypted. In addition to the two specified safety mechanisms, for example, in addition to the measures against so-called bit flips and the encryption of the function and safety keys, any communication exchange between the individual components of the control system, e.g., in particular between the vehicle control and the driver assistance systems, can also be encrypted, and thus protected against manipulation and unauthorized reading. This enables a particular safeguarding of the control system against outside access, e.g. through hacking, to the vehicle control as well as the driver assistance systems.

According to some examples, a method is also provided for operating a control system in a motor vehicle, such as that describe above, which includes: sending the function key from at least one of the driver assistance systems to the vehicle control, sending the safety key from the at least one of the driver assistance systems to the vehicle control, executing the safety check for these function and safety keys by the vehicle control, and activating the at least one corresponding vehicle function by the vehicle control in accordance with the control commands transmitted from the at least one driver assistance system to execute the corresponding assistance function, if the safety check was successful. This method may also include sending the function and safety keys from at least one of the driver assistance systems to the central vehicle control. These two keys can be sent successively or simultaneously, or even collectively, as a file. After the function key and the safety key have been received by the central vehicle control, the vehicle control executes the so-called safety check in which it is determined whether the transmitted safety key satisfies the safety level assigned to at least this function for the function identified in accordance with the function key. If this safety check is successful, the vehicle function that is to be activated in accordance with the function key from the driver assistance system is activated in accordance with the control commands for executing the corresponding assistance function sent from the driver assistance system to the central vehicle control.

A motor vehicle is also provided according to the invention, which includes a control system such as that described above.

Further developments of the method according to various examples that have features such as those described above in the context of developments of the motor vehicle according to the present disclosure. For this reason, the corresponding developments of the method according to the invention shall not be described again here for the sake of brevity.

Turning to FIG. 1, a motor vehicle 1 is illustrated that includes a control system 2. The control system 2 includes a central vehicle control 3 and three vehicle functions 4, and three driver assistance systems 5. In some illustrative examples, three vehicle functions 4 may include, but are not limited to, a brake, drive, and steering for the motor vehicle 1. In some illustrative examples, three driver assistance systems 5 may include, but are not limited to, a parking assistant, a lane retention assistant, and a traffic assistant. Both the three vehicle functions 4 and the three driver assistance systems 5 each have communication connections 6 to the central vehicle control 3. The central vehicle control 3 may be configured to control the three vehicle functions 4, for example, to brake, steer, and accelerate or decelerate the motor vehicle 1.

If the intention is to park the motor vehicle 1 using a parking assistant, e.g., using one of the driver assistance systems 5, the corresponding driver assistance system 5 first sends a function key to the central vehicle control 3. This function key contains information regarding the function in the motor vehicle 1 that the corresponding driver assistance system 5 wants to execute, e.g., in this case a parking assistant. The corresponding driver assistance system 5 may also send a safety key to the central vehicle control 3, which contains information regarding an ASIL (Automotive Safety Integrity Level) for the corresponding driver assistance system 5. In the case of the parking assistant, the function key "parking" and the safety key ASIL D are sent.

The central vehicle control 3 subsequently checks whether the transmitted safety level matches the function, and whether the safety key is suited to the function that has been sent to the central vehicle control 3 by the driver assistance system 5 in the form of the function key. In this case, the ASIL is D, the highest possible ASIL rating, is sufficient for executing the function "parking." The safety check by the central vehicle control 3 was therefore successful, such that it is possible to subsequently activate the vehicle functions 4 according to the specifications of the corresponding driver assistance system 5. The driver assistance system 5 therefore provides control commands to the central vehicle control 5, according to which the execution of the respective assistance function takes place, in this case the parking procedure. These control commands are likewise sent to the central vehicle control 3 via the communication connection 6. Another prerequisite for executing the safety check is that the central vehicle control 3 can access numerous function keys stored therein, such that a function key that has been sent to it can be assigned to a specific function of the corresponding driver assistance system 5 through a comparison with the stored function keys. If the functions or function key designations, e.g. "parking," "lane retention," and "vehicle guidance in traffic" are known to the central vehicle control 3, it can unambiguously assign the function key "parking" sent from the driver assistance system 5 to a function that it knows of.

If another driver assistance system 5' is to be integrated in the control system 2, for example, an emergency braking assistant, this is possible in that the software for this emergency braking assistant is uploaded to a corresponding software component in the motor vehicle 1, which is connected to the central vehicle control 3 via a communication connection 6. If the function "emergency braking" has already been stored in central vehicle control 3, it can subsequently execute the control commands in the newly installed driver assistance system 5', the emergency braking assistant, simply through a corresponding activation of the vehicle functions 4.

An update through an external server 7 can take place to integrate the new driver assistance system 5' or to integrate new function keys in the central vehicle control 3. The corresponding data are sent, e.g., via a wireless connection, from the external server 7 to the corresponding units in the control system 2 for this. Alternatively, it is also possible to install the new driver assistance system 5' or the updates for the central vehicle control 3 on site inside the motor vehicle 1 via a corresponding interface for a data carrier inside the motor vehicle 1. It is therefore possible, with very little effort, to subsequently execute new driver assistance systems 5' or updates of the driver assistance system 5 in a previously delivered motor vehicle 1.

In the framework of the safety check, the central vehicle control 3 can also check whether the activation or execution of the desired function of the driver assistance system 5 makes sense, and is therefore possible, in the current driving situation for the motor vehicle 1. As a result, controlling the motor vehicle 1 in accordance with control commands from a parking assistant serving as the driver assistance system 5 may be prevented if the motor vehicle 1 is moving faster than, for example, 5 km/h. In general, a speed range, driver presence indication, and/or specifications regarding the vehicle environment, are checked in the framework of this additional safety check in the comparison of the current driving situation with the respective target specifications assigned to the function. For this, the central vehicle control 3 accesses further sensors and measurement devices inside and potentially outside the motor vehicle 1, e.g. external cameras, internal cameras, devices for determining whether a driver is present or not in the motor vehicle 1, or GPS coordinates. These target specifications assigned to the respective functions are satisfied, e.g. for the parking assistant serving as a driver assistance system 5, if the current speed of the motor vehicle 1 is slower than 12 km/h, a driver is present in the motor vehicle, and it has been determined on the basis of the environment images from external cameras on the motor vehicle 1 and GPS coordinates that the motor vehicle 1 is in the immediate proximity of a potential parking space.

The control system 2 may be configured with a predetermined selection routine, according to which the sequence for executing the respective assistance functions is regulated, if numerous driver assistance systems 5 simultaneously send respective function keys and safety keys to the central vehicle control 3. If the central vehicle control 3 simultaneously receives a function key from the parking assistant and a function key from a lane retention assistant, i.e. from two different driver assistance systems 5, the sequence in which the driver assistance systems 5 can access the vehicle functions 4 via the central vehicle control 3 can be determined using this selection routine. If the motor vehicle 1 is currently in a traffic jam on a highway, the motor vehicle 1 is first controlled using the traffic assistant. As soon as the motor vehicle 1 exits the highway and approaches a potential parking space, the parking assistant controls the motor vehicle 1 in accordance with the control commands from the parking assistant.

To prevent errors in the function and safety keys transmitted from the driver assistance systems 5 to the central vehicle control 3 due to bit flips, these keys are transmitted as 64-byte numerical values instead of simple three-bit numerical values. In addition, the function and safety keys can be encrypted to protect them against manipulations and unauthorized reading. Alternatively, the data exchange between the central vehicle control 3 and the vehicle functions 4 and the driver assistance systems 5 itself can be encrypted, such that the system is particularly advantageously protected against hacker attacks.

The control units for the individual vehicle functions 4, i.e. the individual components of the motor vehicle 1, e.g. brakes, steering, and drive, also transmit the information that these vehicle functions 4 are now available to the central vehicle control via the communication connection 6, after starting the motor vehicle 1. The individual vehicle functions 4 are therefore registered in the central vehicle control 3 each time the motor vehicle 1 is started up. Any further communication, or data exchange, between the central vehicle control 3 and the control units for the vehicle functions 4 normally takes place upon request from one of the driver assistance systems 5, i.e. in the framework of executing the respective assistance functions of the driver assistance systems 5. This enables a service-based communication within the control system 2, such that a continuous registration of the status of the individual vehicle functions 4 in the central vehicle control 3, such as is normal in conventional control systems 2, is unnecessary.

On the whole, the example shows that a service-based activation of individual vehicle functions 4 in accordance with the driver assistance systems 5 corresponding to the control commands via a central vehicle control 3 is possible with the control system 2 for a motor vehicle 1. Before the corresponding vehicle functions 4 are activated in accordance with these control commands, however, the comparison of a function key and a safety key sent to the central vehicle control 3 from the corresponding driver assistance system 5 first takes place. Only if this safety check is successful, i.e. the comparison of the function key with the possible functions of the driver assistant systems 5 available in the central vehicle control 3, and the comparison of the function key with the necessary safety level necessary for executing this function based on the safety key, an activation of the vehicle functions 4 by the central vehicle control 3 takes place in accordance with the specifications for the driver assistance system 5. The control system 2 therefore enables a particularly logical and consistent, as well as protected, control of the motor vehicle 1.

LIST REFERENCE SYMBOLS 1 motor vehicle
2 control system
3 central vehicle control
4 vehicle function
5 driver assistance system
5' driver assistance system
6 communication connection
7 server

The invention claimed is:

1. A control system for a motor vehicle, comprising
a central vehicle control for activating vehicle functions; and
one or more driver assistance systems, configured to
transmit control commands relating to the vehicle functions for their respective assistance functions to the vehicle control;
transmit a function key that describes the respective assistance functions to the vehicle control, and
transmit a safety key assigned to the respective assistance functions to the vehicle control,
wherein the central vehicle control is configured to
recognize a respective function of the driver assistance system, based on the transmitted function key;
execute a safety check via the vehicle control to determine whether the respective safety key satisfies at least one of the safety levels assigned to the respective recognized function, based on the respective transmitted safety key for the respective recognized function; and
activate the vehicle functions in accordance with the respective control commands transmitted from the driver assistance systems for executing the respective assistance functions.

2. The control system according to claim 1, wherein the central vehicle control is configured to activate vehicle functions comprising at least one of steer, brake, and/or accelerate the vehicle.

3. The control system according to claim 2, wherein the central vehicle control is configured to activate vehicle functions using function keys.

4. The control system according to claim 3, wherein the central vehicle control is configured to recognize the respective functions of the driver assistance systems by comparing the function keys with the function keys stored in the central vehicle control.

5. The control system according to claim 1, further comprising control units configured to transmit functions that can be executed by the respective vehicle functions to the central vehicle control when the motor vehicle is started.

6. The control system according to claim 5, wherein the central vehicle control is configured to perform further data exchange with the control units for the vehicle functions upon request from the driver assistance systems during execution of the respective assistance functions.

7. The control system according to claim 1, wherein the central vehicle control is configured to determine whether target specifications assigned to the respective functions are satisfied with regard to a current driving characteristic for the motor vehicle, and to activate the vehicle functions in accordance with respective control commands for executing the respective assistance functions sent from the one or more driver assistance systems.

8. The control system according to claim 7, wherein the central vehicle control is configured to determine at least one of a speed range, a driver presence indication, and/or specifications regarding the vehicle environment as the target specifications assigned to the respective functions.

9. The control system according to claim 1, wherein the central vehicle control is configured to establish a sequence for executing the respective assistance functions in accordance with a predetermined selection routine, if the central vehicle control has successfully executed safety checks for the one or more driver assistance systems.

10. The control system according to claim 1, wherein the at least one driver assistance system is integrated in the control system, if the respective assistance function of the driver assistance systems can be determined via the function keys known to the central vehicle control.

11. The control system according to claim 1, wherein the at least one driver assistance systems is configured to transmit the function and safety keys such that their data sets are protected against unintentional alterations of individual bits through random hardware errors within the individual data sets.

12. The control system according to claim 1, wherein the at least one driver assistance systems is configured to transmit the function and safety keys in an encrypted form.

13. The control system according to claim 1, wherein at least some of data exchanged within the control system between the central vehicle control and the at least one driver assistance system is encrypted.

14. A control system for a motor vehicle, comprising
a central vehicle control for activating vehicle functions;
transmitting, via one or more driver assistance systems,
    control commands relating to the vehicle functions for their respective assistance functions to a central vehicle control for activating vehicle functions;
    a function key that describes the respective assistance functions to the central vehicle control, and
    a safety key assigned to the respective assistance functions to the vehicle control,
recognizing, via the central vehicle control, a respective function of the driver assistance system, based on the transmitted function key;
executing a safety check via the central vehicle control to determine whether the respective safety key satisfies at least one of the safety levels assigned to the respective recognized function, based on the respective transmitted safety key for the respective recognized function; and
activating, via the central vehicle control, the vehicle functions in accordance with the respective control commands transmitted from the driver assistance systems for executing the respective assistance functions.

15. The method according to claim 14, wherein the vehicle functions comprise at least one of steer, brake, and/or accelerate the vehicle.

16. The method according to claim 15, wherein vehicle functions are activated using function keys.

17. The method according to claim 16, wherein recognizing the respective functions of the driver assistance systems comprises comparing the function keys with the function keys stored in the central vehicle control.

18. The method according to claim 14, further comprising transmitting, via control units, functions that can be executed by the respective vehicle functions to the central vehicle control when the motor vehicle is started.

19. The method according to claim 14, further comprising determining, via the central vehicle control, whether target specifications assigned to the respective functions are satisfied with regard to a current driving characteristic for the motor vehicle, and activating the vehicle functions in accordance with respective control commands for executing the respective assistance functions sent from the one or more driver assistance systems.

20. The method according to claim 19, further comprising determining, via the central vehicle control, at least one of a speed range, a driver presence indication, and/or specifications regarding the vehicle environment as the target specifications assigned to the respective functions.

21. The method according to claim 14, further comprising establishing a sequence, via the central vehicle control, for executing the respective assistance functions in accordance with a predetermined selection routine, if the central vehicle control has successfully executed safety checks for the one or more driver assistance systems.

* * * * *